Figure 1:
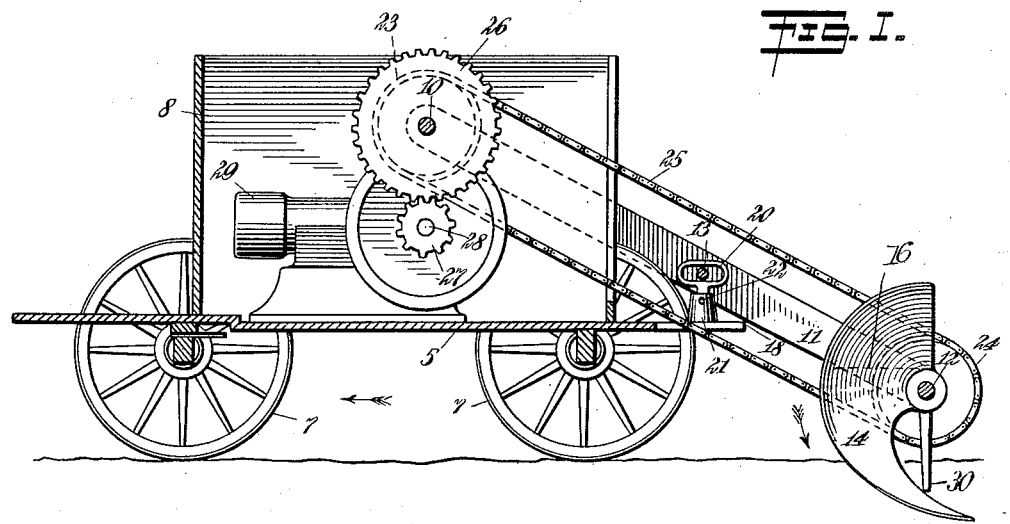

O. L. K. H. OLDENBURG.
PLOW.
APPLICATION FILED MAY 25, 1911.

1,094,240.

Patented Apr. 21, 1914.

2 SHEETS—SHEET 1.

WITNESSES
G. Robert Thomas
E. B. Marshall

INVENTOR
Otto L.K.H. Oldenburg
BY
ATTORNEYS

O. L. K. H. OLDENBURG.
PLOW.
APPLICATION FILED MAY 25, 1911.

1,094,240.

Patented Apr. 21, 1914.

2 SHEETS—SHEET 2.

WITNESSES
G. Robert Thomas
E. B. Marshall

INVENTOR
Otto L.K.H. Oldenburg
BY Munn & Co.
ATTORNEYS

UNITED STATES PATENT OFFICE.

OTTO L. K. H. OLDENBURG, OF MOUNT MORIAH, NATAL, SOUTH AFRICA.

PLOW.

1,094,240.  Specification of Letters Patent.  Patented Apr. 21, 1914.

Application filed May 25, 1911. Serial No. 629,336.

*To all whom it may concern:*

Be it known that I, OTTO L. K. H. OLDENBURG, a British subject, and a resident of Mount Moriah, Weenen county, Natal, South Africa, have invented a new and Improved Plow, of which the following is a full, clear, and exact description.

My invention relates to plows and it has for its object to provide a plurality of plow shares and mold boards mounted on a shaft adapted to be rotated, the mold boards being curved in the manner of a screw propeller blade, so that they will cut the ground and turn it over thoroughly, one mold board extending beyond the vertical plane of the land side of an adjoining plow member to more thoroughly work the surface of the ground between the end plow members on the shaft.

An additional object of the invention is to provide means for holding the shaft carrying the plow members at a predetermined distance above the ground.

Still other objects of the invention will appear in the following complete specification, in which the preferred form of my invention is disclosed.

In the drawings similar characters of reference indicate corresponding parts in all the views, in which—

Figure 2:
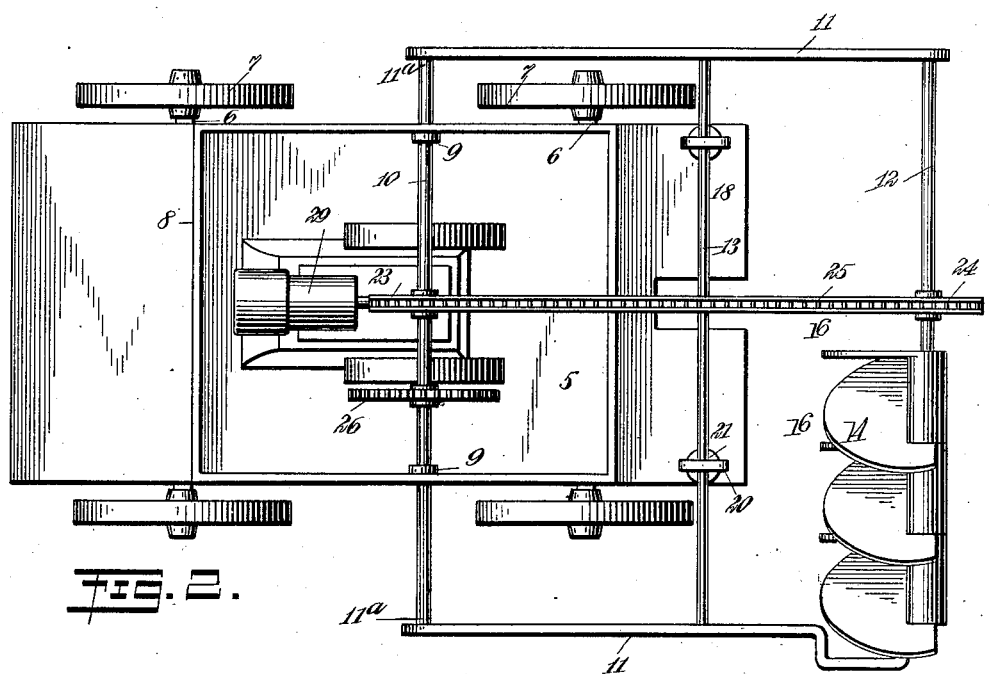
Figure 3:
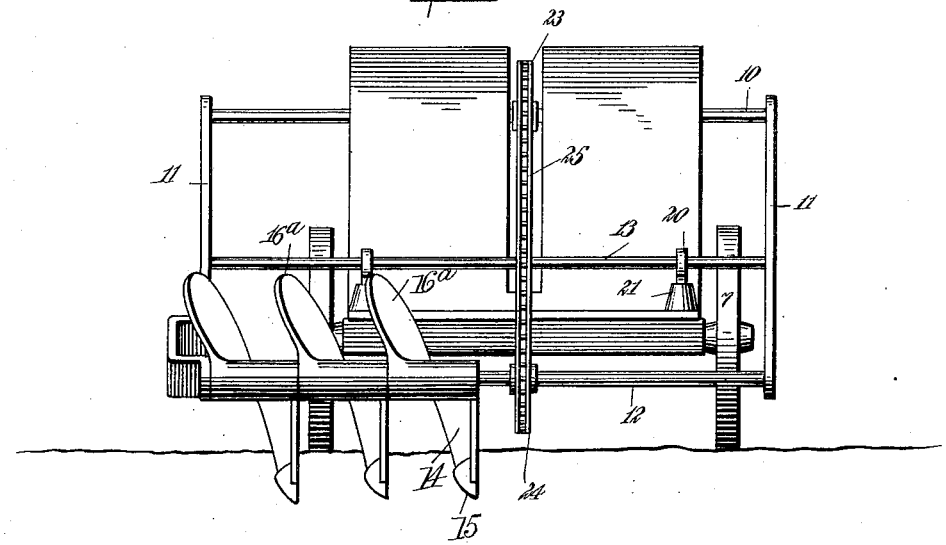
Figure 4:
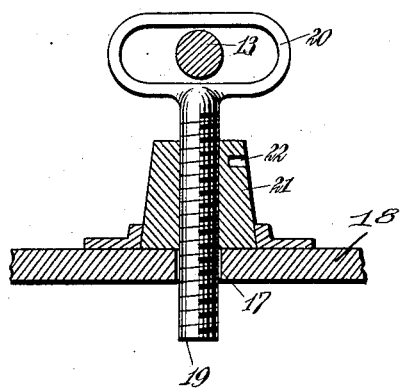

Figure 1 is a side sectional elevation of my improved plow; Fig. 2 is a plan view of Fig. 1; Fig. 3 is an end view of Fig. 1; Fig. 4 is an enlarged fragmentary view showing the means for supporting the arms carrying the shaft on which the plow members are mounted.

By referring to the drawings it will be seen that a wagon body 5 is provided, having axles 6, on which wheels 7 are mounted in the usual manner. A box member 8 is secured to the wagon body 5, the sides of which are provided with bearing members 9, in which a shaft 10 is journaled. Arms 11 have bearings 11$^a$, in which the shaft 10 is journaled, a shaft 12 also being journaled in bearings in the said arms 11. The arms 11, between the shafts 10 and 12, are connected together by means of a transverse member 13. Mounted on the shaft 12 there are a plurality of curved mold boards 14, which, with the curved plow shares 15, and the land sides 16, form the plow members.

As shown in the drawings, the land side of each of the plow members is flat, and is vertically disposed, while the mold boards are curved in the manner of a blade of a screw propeller. The rear extremity 16$^a$ of each of the plow members extends laterally beyond the vertical plane of the land side of the adjoining plow member, the plow members overlapping in this manner, so that the rear extremity of a mold board will act on the surface of the ground which has just been cut by the plow share on an adjoining plow member. There are a plurality of openings 17 in the tail piece 18 of the wagon body 5. Threaded shanks 19, which are secured to eye members 20, are disposed in these openings, the threads on the said shanks being engaged by nut members 21 which rest against the tail board 18 about the said openings 17. There are openings 22 in the nut members 21, in which may be inserted spikes by which they may be readily rotated to raise or lower the eye members 20, in which the transverse member 13 is disposed. A sprocket wheel 23 is secured to the shaft 10, and a similar sprocket wheel 24 is secured to the shaft 12, these sprocket wheels 23 and 24 being connected by a sprocket chain 25. A gear wheel 26 is also secured to the shaft 10, a gear wheel 27, mounted on a shaft 28, meshing with the gear wheel 26. This shaft 28 is connected with the engine 29, by which it is rotated.

In using the invention the wagon body 5 is drawn in the direction of the arrow indicated in Fig. 1 of the drawings, and the engine is operated to drive the mechanism described so that the plow shares and mold boards will be rotated in the direction indicated by the arrow in Fig. 1 of the drawings. When thus rotated, the plow shares 15 will cut the ground which will be raised and turned over by the mold boards 16, in very much the same way as a gardener digs with a spade and raises the dirt, turning it over as he deposits it.

It will be understood that the plow members which I have described may be spaced apart and mounted as may be desired on the shaft 12, and if desired a number of these shafts 12 may be disposed one in front of the other, each provided with one or more of the plow members fully described in this specification.

If desired cutters 30 may be secured to the shaft 12 in front of the plow share 15 for cutting the sod.

Having thus described my invention I claim as new and desire to secure by Letters Patent:

1. In a plow, a shaft, land side members spaced apart and secured to the shaft, and screw shaped plow members secured to the shaft and extending around the shaft substantially 180 degrees, the rear of the screw-shaped plow members extending beyond the vertical planes of the adjacent land side members.

2. In a plow, a shaft, and screw-shaped plow members secured to the shaft and extending around the shaft substantially 180 degrees, the plow members having entrance points spaced from the shaft and extending forward.

In testimony whereof I have signed my name to this specification in the presence of two subscribing witnesses.

OTTO L. K. H. OLDENBURG.

Witnesses:
J. W. FOCKERS,
HUGH S. HOOD.

Copies of this patent may be obtained for five cents each, by addressing the "Commissioner of Patents, Washington, D. C."